United States Patent [19]
Ota et al.

[11] Patent Number: 5,925,438
[45] Date of Patent: Jul. 20, 1999

[54] ANTIREFLECTION FILM

[75] Inventors: Yurie Ota; Norinaga Nakamura; Mitsuru Tsuchiya, all of Shinjuku-Ku, Japan

[73] Assignee: Dai Nippon Printing Co., Ltd., Japan

[21] Appl. No.: 08/876,907

[22] Filed: Jun. 16, 1997

[30] Foreign Application Priority Data

Jun. 17, 1996 [JP] Japan ..................... 8-177508
Jun. 17, 1996 [JP] Japan ..................... 8-177509
Jun. 17, 1996 [JP] Japan ..................... 8-177510

[51] Int. Cl.$^6$ ................................... B32B 3/00
[52] U.S. Cl. .................. 428/141; 428/143; 428/149; 428/323; 428/325; 428/331
[58] Field of Search ................... 428/141, 143, 428/149, 206, 212, 217, 323, 325, 328, 330, 331

[56] References Cited

U.S. PATENT DOCUMENTS 5,747,152  5/1998  Oka et al. ........................ 428/323

*Primary Examiner*—Elizabeth Evans
*Attorney, Agent, or Firm*—Parkhurst & Wendel, L.L.P.

[57] ABSTRACT

An antireflection film comprising a transparent substrate film, a hard coat layer formed on the transparent substrate film either directly or through other layer, and a low-refractive-index layer formed on the hard coat layer either directly or through other layer, wherein the low-refractive-index layer is a $SiO_2$ gel layer formed by using a $SiO_2$ sol prepared by hydrolyzing a silicon alkoxide represented by $CH_3Si(OR)_3$ wherein R is an alkyl group having 1 to 3 carbon atoms.

16 Claims, 1 Drawing Sheet

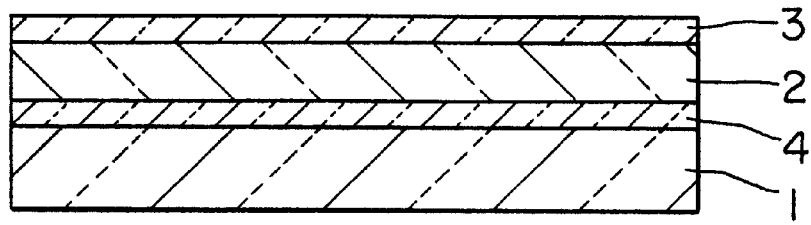
F I G. 1
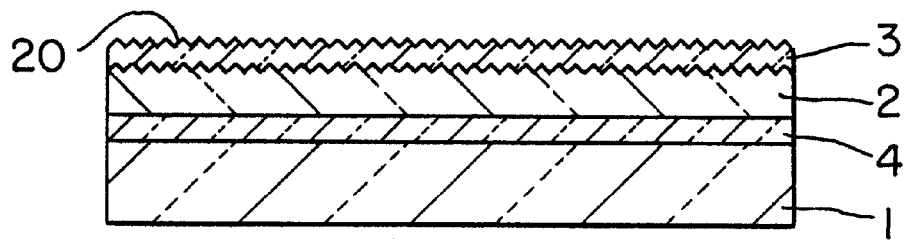
F I G. 2
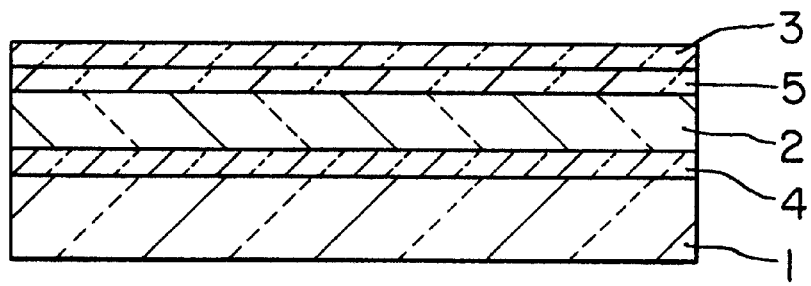
F I G. 3
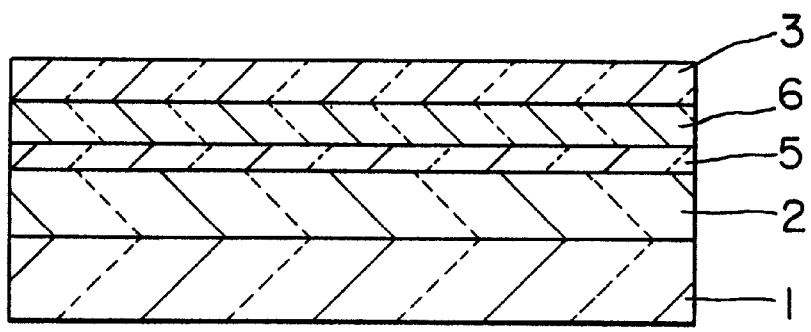
F I G. 4

ANTIREFLECTION FILM

TECHNICAL FIELD

The present invention relates to an antireflection film capable of imparting excellent antireflection properties to the surfaces of polarizing panels used for various displays of word processors, computers, televisions, plasma display panels, etc. and for liquid crystal displays, to the surfaces of optical lenses made from transparent plastics, such as lenses of sun glasses, spectacles and camera finders, to the surfaces of the covers of a variety of meters, and to the surfaces of window glasses of automobiles, trains or the like.

BACKGROUND ART

Glass- or plastic-made transparent substrates have conventionally been used for curved mirrors, back mirrors, goggles, window glasses, displays of personal computers, word processors or plasma displays, and other various displays for commercial use. There has been such a problem that, when it is tried to observe visual information such as objects, letters or figures through the transparent substrate, or when it is tried, in the case of a mirror, to observe an image reflected by a reflective layer through the transparent substrate, the inner visual information cannot be clearly seen because the surface of the transparent substrate reflects external light.

Heretofore, there have been known, as methods for preventing the transparent substrate from reflecting light, a method in which an antireflection coating is coated onto the surface of the glass or plastic substrate; and a method in which a thin $MgF_2$ or $SiO_2$ film having a thickness of approximately 0.1 micrometers is provided on the surface of the glass or plastic transparent substrate directly, or, when necessary, through a hard coat layer by a gas phase method such as vapor deposition, sputtering or plasma CVD.

Highly-functional thin films with high quality can be obtained by gas phase methods. However, when a high-vacuum system is employed to obtain such thin films, it is required to precisely control the atmosphere. Further, a special heater or ion-generation accelerator is needed, so that the production system is complicated, and becomes large in size. As a result, the production cost is inevitably increased. In addition, gas phase methods have such a problem that it is difficult to produce thin films having increased areas, or being complicated in shape.

On the other hand, among coating methods for forming functional thin films, the spray method has such problems that a coating liquid cannot be efficiently used and that it is difficult to control the conditions of film formation.

Further, when the dipping method or screen printing method, one of coating methods, is employed to form a functional thin film, materials for the film can be efficiently used. Moreover, these methods are advantageous when the mass-production of films and the plant cost are taken into consideration. However, functional thin films obtained by the dipping method or screen printing method are inferior to thin films obtained by a gas phase method in both function and quality.

In recent years, there has been proposed, as a method for obtaining thin films with high quality by a coating method, a method in which a dispersion prepared by dispersing inorganic or organic ultrafine particles in an acidic or alkaline aqueous solution is coated onto a substrate, and then calcined. This production method is advantageous when the mass-production of thin films and the plant cost are taken into consideration. However, a high-temperature calcination step is needed during the production process, so that a film cannot be formed on a plastic substrate by means of this method. Moreover, a film formed on a substrate cannot have sufficiently high uniformity due to the difference between the degree of shrinkage of the substrate and that of the film coated thereon. Thin films obtained by this method are thus still poor in quality when compared with thin films obtained by a gas phase method. In addition, a long time (for example, several tens of minutes or longer) is taken for the heat treatment, so that this method is unsatisfactory in productivity.

An object of the present invention is therefore to provide a highly-functional antireflection film with high quality, which can be produced inexpensively in a short time.

DISCLOSURE OF THE INVENTION

An antireflection film of the present invention comprises a transparent substrate film, a hard coat layer provided on the transparent substrate film either directly or through another layer, and a low-refractive-index layer provided on the hard coat layer either directly or through another layer, wherein the low-refractive-index layer comprises a $SiO_2$ gel layer which is formed by using a $SiO_2$ sol prepared by hydrolyzing a silicon alkoxide represented by $CH_3Si(OR)_3$ wherein R is an alkyl group having 1 to 3 carbon atoms.

According to the present invention, a lower silicon alkoxide is hydrolyzed to obtain fine particles of several nanometers by sol-gel processing; a sol in which these ultrafine particles are being dispersed is coated onto the hard coat layer provided on the surface of the transparent substrate film; and the coated layer is thermally treated at a temperature lower than the deflection temperature of the transparent substrate film, or irradiated with activation energy rays, thereby forming a $SiO_2$ gel layer. By this, a low-refractive-index layer whose quality is almost equal to that of a low-refractive-index layer obtainable by a gas phase method can be obtained. Moreover, even when a substrate, such as a plastic substrate, whose deflection temperature under load is low is used, a highly-functional antireflection film with high quality can be obtained.

BRIEF DESCRIPTION OF THE DRAWINGS

In the drawings,

FIGS. 1 to 4 are cross-sectional views, each showing an embodiment of the antireflection film of the present invention.

BEST MODE FOR CARRYING OUT THE INVENTION

FIG. 1 is a schematic cross-sectional view showing one embodiment of the antireflection film according to the present invention. The antireflection film shown in this figure shows an embodiment in which a hard coat layer 2 and a low-refractive-index layer 3 are formed on a transparent substrate film 1. In the figure, the numeral 4 indicates an adhesive layer or primer layer which is provided when necessary.

FIG. 2 shows an embodiment in which fine roughness 20 is provided on the outermost surface of the antireflection film shown in FIG. 1 in order to impart thereto antiglaring properties.

FIG. 3 shows an embodiment in which a hard coat layer 2, a high-refractive-index layer 5 and a low-refractive-index layer 3 are provided on a transparent substrate film 1. In this figure, the numeral 4 indicates an adhesive layer or primer layer which is provided when necessary.

FIG. 4 shows an embodiment in which a hard coat layer 2, a high-refractive-index layer 5, an electrically conductive transparent layer 6 and a low-refractive-index layer 3 are provided on a transparent substrate film 1.

The above-described structures and methods for producing antireflection films of the structures will now be explained.

Transparent Substrate Film

In the present invention, any film can be used as the transparent substrate film serving as the substrate of an antireflection film, as long as it has transparency. For example, a triacetyl cellulose, diacetyl cellulose, acetate butyrate cellulose, polyether sulfone, polyacrylic resin, polyurethane resin, polyester, polycarbonate, polysulfone, polyether, trimethylpentene, polyether ketone, or (meth) acrylonitrile film can be used as the transparent substrate film.

Of the above films, a mono- or bi-axially oriented polyester film is preferably used because such a film is excellent in both transparency and heat resistance, and has no optical anisotropy. The thickness of the transparent substrate film is, in general, approximately 8 to 1,000 micrometers.

Hard Coat Layer

The hard coat layer to be provided on the surface of the above-described transparent substrate film in the embodiment shown in FIG. 1 can be formed by using a thermosetting resin or ionizing-radiation-curable resin. However, since the transparent substrate film is made from a thermoplastic resin, it is preferable to use an ionizing-radiation-curable resin which is hardened at low temperatures. In this specification, the term "hard coat layer" or "layer having a high hardness" means a layer having a hardness of "H" or harder when determined by the pencil hardness test according to JIS K5400. Further, in this specification, the term "high refractive index" or "low refractive index" means that the refractive index of a layer is relatively higher or lower than that of a layer adjacent thereto.

An ionizing-radiation-curable resin suitable for forming the hard coat layer is preferably a resin containing acrylate functional groups, such as a polyester, polyether, acrylic, epoxy, urethane, alkyd, spiroacetal, polybutadiene or polythiol polyene resin having a relatively low molecular weight; a (meth)acrylate oligomer or prepolymer of a polyfunctional compound such as a polyhydric alcohol; or a resin containing, as a reactive diluent, a relatively large amount of a monofunctional monomer such as ethyl (meth)acrylate, ethylhexyl (meth)acrylate, styrene, methylstyrene or N-vinylpyrrolidone, or a polyfunctional monomer such as trimethylolpropane tri(meth)acrylate, hexanediol (meth) acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate or neopentyl glycol di(meth)acrylate.

Further, in order to make the above-described ionizing-radiation-curable resins to ultraviolet-light-curable ones, a photopolymerization initiator selected from acetophenones, benzophenones, Michler's benzoylbenzoate, alpha-amyloxime esters, tetramethyl thiuram monosulfide and thioxanthones, or a photosensitizer such as n-butylamine, triethylamine or tri-n-butylphosphine can be added to the ionizing-radiation-curable resins.

In the case where the hard coat layer is formed by using the above-described ionizing-radiation-curable resin only, the layer has decreased flexibility when the resin is excessively crosslinked when hardened. As a result, when the resulting antireflection film is bent, the hard coat layer can be easily cracked.

In order to solve the above problem, it is preferable to add a non-reactive resin to a composition for forming the hard coat layer in an amount of not more than approximately 50% by weight of the total amount of the composition. When the non-reactive resin is added in an amount in excess of this range, the resulting hard coat layer can be insufficient in hardness. A thermoplastic resin is mainly used as this non-reactive resin.

In the present invention, it is particularly preferable that the hard coat layer be a hardened layer made from a composition comprising an ionizing-radiation-curable resin containing siloxane-modified acrylate, and epoxy acrylate. The combination use of an ionizing-radiation-curable resin containing siloxane-modified acrylate, and epoxy acrylate is advantageous in that the adhesion between the hard coat layer and the low-refractive-index layer, which will be described later, is unexpectedly improved. As the siloxane-modified acrylate for use in this case, "X-12-2400" manufactured by Shin-Etsu Chemical Co., Ltd., Japan is particularly preferred. Further, as the epoxy acrylate, one obtained from bisphenol A, for example, "Denacol Acrylate DA-250" available from NAGASE & COMPANY, LTD., Japan is preferably used. The ratio of siloxane-modified acrylate to epoxyacrylate is preferably 7:3.

The refractive index of the hard coat layer containing the above-described components is, in general, approximately 1.49 to 1.51. In the embodiment shown in FIG. 1, it is preferable to add ultrafine particles of a metal or metallic oxide, having a high refractive index to a resin composition for forming the hard coat layer in order to increase the refractive index of the hard coat layer to approximately 1.50 to 2.30. Examples of the material that can increase the refractive index of the hard coat layer include fine powders such as ZnO (refractive index=1.90), $TiO_2$ (refractive index=2.3–2.7), $CeO_2$ (refractive index=1.95), $Sb_2O_5$ (refractive index=1.71), $SnO_2$, ITO (refractive index=1.95), $Y_2O_3$ (refractive index=1.87), $La_2O_3$ (refractive index= 1.95), $ZrO_2$ (refractive index=2.05) and $Al_2O_3$ (refractive index=1.63).

Further, in order to further improve the refractive index of the hard coat layer, it is possible to incorporate a resin containing a molecule or atom having a high refractive index into a resin composition for forming the hard coat layer. Examples of such a molecule or atom include halogen atoms except fluorine, atoms such as S, N and P, and aromatic rings.

The hard coat layer containing the above-described components can be formed by dissolving or dispersing the components in a proper solvent to obtain a coating liquid, coating this coating liquid directly onto the previously-mentioned transparent substrate film, and hardening the coated layer. Alternatively, the hard coat layer can also be formed by coating the coating liquid onto a release film, hardening the coated layer, and transferring the resulting hardened layer to the transparent substrate film through a proper adhesive agent. It is preferable that the thickness of the hard coat layer be, in general, approximately 3 to 10 micrometers.

To harden the above hard coat layer, a conventional method for hardening ionizing-radiation-curable resins, that is, a method in which a resin is hardened by electron-beam or ultraviolet-light irradiation can be used. Namely, in the case of hardening by means of electron-beam irradiation, an electron beam with an energy of 50 to 1,000 KeV, preferably 100 to 300 KeV, emitted from an electron beam accelerator of Cockcroft-Walton type, Van de Graaff type, resonance transformation type, insulation core transformer type, linear type, dynamitron type or high-frequency type can be used; and in the case of hardening by means of ultraviolet-light irradiation, ultraviolet light emitted from such a light source as ultra-high-pressure mercury vapor lamp, high-pressure mercury vapor lamp, low-pressure mercury vapor lamp, carbon arc, xenone arc or metal halide lamp can be used.

Low-Refractive-Index Layer

By forming, on the surface of the above-described hard coat layer 1, the low-refractive-index layer 2 which is a $SiO_2$ gel film having a refractive index of 1.38 to 1.46 by the use of a $SiO_2$ sol, an antireflection film of the present invention as shown in FIG. 1 can be obtained. Also in the embodiments shown in FIGS. 2 to 4, the low-refractive-index layer 2 can be formed in the same manner as the above.

The $SiO_2$ sol can be prepared by dissolving a silicon alkoxide in an organic solvent suitable for coating, and adding a predetermined amount of water to the solution to hydrolyze the silicon alkoxide.

Preferable examples of the silicon alkoxide to be used for forming the $SiO_2$ sol include those compounds which are represented by $CH_3Si(OR')_3$, wherein R is an alkyl group having 1 to 3 carbon atoms. Specifically, the silicon alkoxide is methyltrimethoxysilane, methyltriethoxysilane, or methyltripropoxysilane.

The hydrolysis of the above silicon alkoxide is carried out after dissolving the silicon alkoxide in a proper solvent. Examples of the solvent include alcohols, ketones and esters such as methyl ethyl ketone, isopropyl alcohol, methanol, ethanol, methyl isobutyl ketone, ethyl acetate and butyl acetate, halogenated hydrocarbons, and aromatic hydrocarbons such as toluene and xylene, and mixtures thereof.

The silicon alkoxide is dissolved in the above solvent so that the amount of $SiO_2$ which is produced when the silicon alkoxide is completely hydrolyzed or condensed will be 0.1% by weight or more, preferably 0.1 to 10% by weight. When the concentration of the $SiO_2$ sol is less than 0.1% by weight, the resulting gel film cannot fully show the desired properties. On the other hand, when the concentration of the $SiO_2$ sol is in excess of 10% by weight, it is less likely to form a transparent uniform film. Further, in the present invention, it is also possible to add an organic or inorganic binder to the $SiO_2$ sol within the limit that the solid content of the $SiO_2$ sol does not exceed the above-described range.

To this solution, water is added in an amount excessive for carrying out hydrolysis, and the mixture is stirred at a temperature of 15 to 35° C., preferably 22 to 28° C., for 0.5 to 10 hours, preferably 2 to 5 hours.

In the above hydrolysis, it is preferable to use a catalyst. As the catalyst, an acid such as hydrochloric acid, nitric acid, sulfuric acid or acetic acid is preferred. Such an acid is added as an aqueous solution of about 0.001 to 20.0 N, preferably about 0.005 to 5.0 N. The water contained in this aqueous solution can be utilized as water which is needed to carry out the hydrolysis.

The thus-obtained $SiO_2$ sol is a colorless and transparent stable solution with a pot life of approximately one month. This sol has the properties of thoroughly wetting the previously-mentioned hard coat layer, and is excellent in coating properties.

To the above sol, various additives can be added. A hardening agent capable of accelerating film formation can be mentioned as one of such additives. As the hardening agent, there can be mentioned a metallic salt of an organic acid such as sodium acetate or lithium acetate, dissolved in an organic acid such as acetic acid or formic acid.

In the present invention, it is particularly preferable to incorporate sodium acetate and acetic acid as the hardening agent in order to improve the film properties.

The concentration of the organic acid solution is approximately 0.01 to 0.1% by weight. The organic acid solution is added to the $SiO_2$ sol in such an amount that the amount of the organic acid salt will be approximately 0.1 to 1 parts by weight for 100 parts by weight of $SiO_2$ present in the sol. The gel film obtained from this sol contains $SiO_2$ granules having a diameters of 30 to 60 nm. Further, the refractive index of the gel film is adjusted to 1.42 or less, which is lower than the refractive index of an ordinary $SiO_2$-deposited film, that is, 1.46.

The finally-obtainable gel film serves as the low-refractive-index layer of the antireflection film, and there may be a case where it is necessary to adjust the refractive index of the gel film. For instance, a fluorine organosilicon compound can be added in order to decrease the refractive index; an organosilicon compound can be added in order to increase the refractive index; and a boron organic compound can be added in order to further increase the refractive index. Specific examples of the organosilicon compound include tetraethoxysilane, tetramethoxysilane, tetrapropoxysilane, tetrabutoxysilane, alkyltrialkoxysilane, "Colcoat 40" manufactured by Colcoat Co., Ltd., Japan, "MS51" manufactured by Mitsubishi Chemical Corp., Japan and "Snowtex" manufactured by Nissan Chemical Industries, Ltd., Japan. Specific examples of the fluorine compound include "Zaflon FC-110", "Zaflon FC-220" and "Zaflon FC-250" manufactured by Toa Gosei Chemical Industry Co., Ltd., Japan, "Ceclar Coat A-402B" manufactured by Central Glass Co., Ltd., Japan, heptadecafluorodecyltrimethoxy-silane, tridecafluoro-octyltrimethoxysilane and trifluoropropyltrimethoxysilane. Specific examples of the boron compound include triethyl borate, trimethyl borate, tripropyl borate and tributyl borate. These additives can be added when the sol is prepared, or after the sol is formed. When the additives are used, they react with a silanol group during or after the hydrolysis of the silicon alkoxide. A sol which is more homogenous and transparent can thus be obtained, and the refractive index of the resulting gel film can be changed to some extent.

The low-refractive-index layer can be formed by the following method, using the above $SiO_2$ sol: the $SiO_2$ sol is coated onto the surface of the previously-mentioned hard coat layer by a coating method, and the coated film is irradiated with activation energy rays or heated, thereby forming a $SiO_2$ gel film. The gel film formed by this method has considerably improved adhesion to the hard coat layer. It is preferable that the thickness of the low-refractive-index layer thus obtained be generally in the range of approximately 50 to 300 nm.

As a method for coating the above $SiO_2$ sol onto the hard coat layer, there can be mentioned spin coating, dip coating, spray coating, roll coater, meniscus coater, flexographic printing, screen printing, or bead coater method.

The heat treatment is carried out, after the above sol is coated onto the hard coat layer, at a temperature lower than the deflection temperature under load of the transparent substrate film. For instance, when a polyethylene terephthalate film (PET) is used as the transparent substrate film, it is possible to form the gel film of silica by carrying out the heat treatment at approximately 80 to 150° C. for 1 minute to 1 hour. The conditions of the heat treatment vary depending upon the type and thickness of the transparent substrate film used. Therefore, the conditions can be determined depending upon the type of the transparent substrate film used.

Electron beam or ultraviolet light can be used as activation energy rays to harden the sol coated. Electron beam which is the same as the one used to harden the hard coat layer is particularly preferred.

It is preferable that the above-described thermal treatment and electron-beam irradiation be conducted while replacing the air with oxygen, or in an atmosphere of oxygen. When the treatment and irradiation are carried out in an atmosphere of oxygen, the formation and polymerization or condensation of $SiO_2$ is accelerated, and a gel layer having higher uniformity and higher quality can be obtained.

Formation of Fine Roughness

FIG. 2 shows an embodiment in which fine roughness 20 is provided on the outermost surface of the antireflection film in order to impart thereto the antiglaring properties. The formation of fine roughness can be conducted by any known method. For instance, the following method is preferably employed: when the hard coat layer is formed by a transfer method, a matte film having fine roughness on the surface thereof is used as the substrate film of a sheet to be used for transferring; a coating liquid for forming the hard coat layer is coated onto the matte film, and hardened; and the hardened layer is then transferred to the transparent substrate film through, if necessary, an adhesive agent or the like, thereby forming, on the transparent substrate film, the hard coat layer having fine roughness on the surface thereof.

Another method is as follows: a coating liquid for forming the hard coat layer is coated onto the surface of the transparent substrate film, and then dried; the above-described matte film is brought into pressure contact with the surface of the resin layer, and the resin layer is hardened as it is; and the matte film is then released from the resin layer, thereby transferring the fine roughness on the matte film to the surface of the hard coat layer. In any case, the low-refractive-index layer to be formed on the surface of the hard coat layer having fine roughness is a thin film, so that the fine roughness 20 appears on the surface of the low-refractive-index layer.

In addition to the above-explained layers, those layers which have various functions can further be provided to the antireflection film of the present invention. For instance, it is possible to provide an adhesive layer or primer layer in order to improve the adhesion between the transparent substrate film and the hard coat layer. Further, it is also possible to form the hard coat layer as a laminate composed of a plurality of layers in order to improve the hardness of the hard coat layer. It is preferable that the refractive index of such an optional layer provided between the transparent substrate film and the hard coat layer be made between the refractive index of the transparent substrate film and that of the hard coat layer, or equal to either one of these refractive indexes.

The above-described optional layer can be formed by directly or indirectly coating a proper coating liquid onto the transparent substrate film. Alternatively, in the case where the hard coat layer is formed on the transparent substrate film by a transfer method, the optional layer can be formed in the following manner: a coating liquid for forming the optional layer is coated onto the surface of the hard coat layer which is formed on a release film; the transparent substrate film and the release film are laminated to each other with the coated surface of the release film faced inside; and the release film is released to transfer the optional layer to the transparent substrate film along with the hard coat layer. In addition, a pressure-sensitive adhesive can also be applied to the back surface of the antireflection film of the present invention. Such an antireflection film can be adhered to an object, for example, a polarizing element so as to prevent the reflection of light.

High-Refractive-Index Layer

In the embodiments shown in FIGS. 3 and 4, a high-refractive-index layer 5 having a refractive index higher than that of the hard coat layer 2 is further provided on the hard coat layer 2. Moreover, in the embodiment shown in FIG. 4, a transparent electrically conductive layer 6 is further provided on the high-refractive-index layer 5. In the present invention, the terms "high refractive index" and "low refractive index" are relative expressions, and they show the relative relationship between two laminated layers in terms of refractive index; that is, they show that the refractive index of one layer is higher or lower than that of the other layer.

As a method for forming the high-refractive-index layer, there can be mentioned a method in which a coating prepared by dispersing fine particles in a binder resin, the refractive index of the fine particles and that of the binder resin being different from each other, is used to form the high-refractive-index layer; and a method in which a metallic oxide gel is used to form the high-refractive-index layer.

Examples of the binder resin for use in the former method include binder resins having high refractive indexes such as resins containing aromatic rings, resins containing halogen atoms except fluorine, for example, Br, I and Cl, and resins containing such atoms as S, N and P. Those resins which can meet at least one of these conditions have high refractive indexes, so that they are preferable as the binder resins. Specific examples of the above-described resins include styrol resins such as polystyrene, polyethylene terephthalate, polyvinyl carbazole, and polycarbonate resins such as bisphenol A. Other examples of the above resins include polyvinyl chloride, tetrabromobisphenol A glycidyl ether, polybisphenol S glycidyl ether and polyvinyl pyridine.

Examples of the high-refractive-index fine particles to be dispersed in the above-described binder resin include ZnO (refractive index=1.90), $TiO_2$ (refractive index 2.3–2.7), $CeO_2$ (refractive index=1.95), $Sb_2O_5$ (refractive index=1.71), $SnO_2$, ITO (refractive index=1.95), $Y_2O_3$ (refractive index=1.87), $La_2O_3$ (refractive index=1.95), $ZrO_2$ (refractive index=$_{2.05}$) and $Al_2O_3$ (refractive index=1.63). Of these fine particles, $ZrO_2$, ZnO, $TiO_2$ and $CeO_2$ are preferred. This is because the UV-shielding properties are further imparted to the antireflection film of the present invention when such fine particles are used.

A coating liquid for forming the high-refractive-index layer can be prepared by changing the type of the binder resin to be used, and the type and amount of the fine particles to be dispersed in the binder resin. It is preferable to determine the composition of the coating liquid for forming the high-refractive-index layer so that the refractive index of the layer formed will be in the range of 1.50 to 2.30 and higher than the refractive index of the hard coat layer. On the other hand, in the case where a transparent electrically conductive layer 6 is provided between the high-refractive-index layer 5 and the low-refractive-index layer 3, it is preferable to determine the composition of the coating liquid so that the refractive index of the high-refractive-index layer will be in the range of 1.50 to 1.95 and lower than the refractive index of the transparent electrically conductive layer 6. The high-refractive-index layer can be formed by a coating method. It is preferable that the thickness of the high-refractive-index layer formed by a coating method be in the range of approximately 50 to 300 nm.

In the case where an ionizing-radiation-curable resin is used as the above-described binder resin, the resin can be hardened by an ordinary method for hardening ionizing-radiation-curable resins, that is, by electron-beam or ultraviolet-light irradiation. Namely, in the case of hardening by means of electron-beam irradiation, electron beam with an energy of 50 to 1,000 KeV, preferably 100 to 300 KeV, emitted from an electron beam accelerator of Cockcroft-Walton type, Van de Graaff type, resonance transformation type, insulation core transformer type, linear type, dynamitron type or high-frequency type can be used; and in the case of hardening by means of ultraviolet-light irradiation, ultraviolet light emitted from such a light source as ultra-high-pressure mercury vapor lamp, high-pressure mercury vapor lamp, low-pressure mercury vapor lamp, carbon arc, xenone arc or metal halide lamp can be used.

As one example of the method for forming the high-refractive-index layer from a metallic oxide sol, a method using a lower metallic alkoxide can be mentioned. In this method, a metallic oxide sol prepared by hydrolyzing a lower metallic alkoxide represented by $Ti(OR)_4$, in which R represents an alkyl group having 2 to 4 carbon atoms, is coated, thereby forming a metallic oxide gel layer serving as the high-refractive-index layer. The refractive index of the high-refractive-index layer formed by such a coating method falls in the previously-mentioned range, and the thickness of the high-refractive-index layer is preferably in the range of approximately 50 to 300 nm.

Specific examples of the lower metallic alkoxide include titanium tetraethoxide, titanium tetra-i-propoxide, titanium tetra-n-propoxide, titanium tetra-n-butoxide, titanium tetra-sec-butoxide, and titanium tetra-tert-butoxide.

The hydrolysis of the above metallic alkoxide is carried out after dissolving the metallic alkoxide in a proper solvent. Examples of the solvent include alcohols, ketones and esters such as methyl ethyl ketone, isopropyl alcohol, methanol, ethanol, methyl isobutyl ketone, ethyl acetate and butyl acetate, halogenated hydrocarbons, and aromatic hydrocarbons such as toluene and xylene, and mixtures thereof.

The above-described metallic alkoxide is dissolved in the above solvent so that the amount of the metallic oxide which is produced when the metallic alkoxide is completely hydrolyzed or condensed will be 0.1% by weight or more, preferably 0.1 to 10% by weight. When the concentration of the metallic oxide sol is less than 0.1% by weight, the resulting functional film cannot fully show the desired properties. On the other hand, when the concentration of the metallic oxide sol is in excess of 10% by weight, it is difficult to form a transparent uniform film.

Further, by changing the concentration of the metallic oxide sol within the above-described range, the refractive index of the resulting gel film, which is proportional to the sol concentration, can be controlled. Furthermore, in the present invention, it is also possible to add an organic or inorganic binder to the metallic oxide sol within the limit that the solid content of the sol dose not exceed the above-described range.

To the above alkoxide solution, water is added in an amount excessive for carrying out hydrolysis, and the mixture is stirred at a temperature of 15 to 35° C., preferably 22 to 28° C., for 5 to 30 hours, preferably 12 to 16 hours. In this hydrolysis, it is preferable to use a catalyst. As the catalyst, an acid such as hydrochloric acid, nitric acid, sulfuric acid, formic acid or acetic acid is preferred. Such an acid is added as an aqueous solution of about 0.1 to 20.0 N, preferably about 0.5 to 7.0 N. The water contained in this aqueous solution can be utilized as water which is needed to carry out the hydrolysis.

By changing the catalyst concentration within the above-described range when the hydrolysis is carried out, the refractive index of the gel film, which is proportional to the catalyst concentration, can be controlled.

The metallic oxide sol thus formed is a colorless and transparent stable solution with a pot life of approximately one month. This sol has the properties of thoroughly wetting a material onto which the sol is coated, and is excellent in coating properties.

When it is necessary to adjust the refractive index of the gel film which will finally be the high-refractive-index layer, a fluorine organosilicon compound, an organosilicon compound, a boron organic compound or the like can be added, for instance, to decrease the refractive index. Specific examples of the organosilicon compound include tetraethoxysilane, tetramethoxysilane, tetrapropoxysilane, tetrabutoxysilane, alkyltrialkoxysilane, "Colcoat 40" manufactured by Colcoat Co., Ltd., Japan, "MS51" manufactured by Mitsubishi Chemical Corp., Japan and "Snowtex" manufactured by Nissan Chemical Industries, Ltd., Japan. Specific examples of the fluorine compound include "Zaflon FC-110", "Zaflon FC-220" and "Zaflon FC-250" manufactured by Toa Gosei Chemical Industry Co., Ltd., Japan, "Ceclar Coat A-402B" manufactured by Central Glass Co., Ltd., Japan, heptadecafluorodecyltrimethoxysilane, tridecafluoro-octyltrimethoxysilane and trifluoro-propyltrimethoxysilane. Specific examples of the boron compound include triethyl borate, trimethyl borate, tripropyl borate and tributyl borate. These additives can be added when the metallic oxide sol is prepared, or after the metallic oxide sol is formed.

In order to increase the refractive index, it is necessary to change the concentration of the catalyst to be added, the amount of water, and the solid content of the sol. When they are increased, the refractive index tends to be increased. When the above additives are added, they react with hydroxyl group during or after the hydrolysis of the metallic alkoxide. A sol which is homogenous and transparent can thus be obtained, and the refractive index of the resulting gel film can be changed to some extent.

As a method for coating the metallic oxide sol, there can be mentioned spin coating, dip coating, spray coating, roll coater, meniscus coater, flexographic printing, screen printing or bead coater method.

The coated film is subjected to a heat treatment and/or activation-energy-ray irradiation treatment, thereby forming a metallic oxide gel film. The heat treatment is carried out, after the above sol solution is coated, at a temperature lower than the deflection temperature under load of the transparent substrate film. For instance, when a polyethylene terephthalate film (PET) is used as the transparent substrate film, it is possible to form a metallic oxide gel film by carrying out the heat treatment at approximately 80 to 150° C. for approximately 1 minute to 1 hour. The conditions of the heat treatment vary depending upon the type and thickness of the transparent substrate film used. Therefore, the conditions can be determined depending upon the type of the transparent substrate film used.

It is preferable that the above-described thermal treatment be carried out while replacing the air with oxygen, or in an atmosphere of oxygen. When the thermal treatment is carried out in an atmosphere of oxygen, the formation and polymerization or condensation of the metallic oxide gel is accelerated, and a gel layer having higher uniformity and higher quality can be obtained.

Electron beam or ultraviolet light can be used as activation energy rays after the above sol is coated, and electron beam is particularly preferred. In the case of hardening by means of electron-beam irradiation, electron beam with an energy of 50 to 1,000 KeV, preferably 100 to 300 KeV, emitted from an electron beam accelerator of Cockcroft-Walton type, Van de Graaff type, resonance transformation type, insulation core transformer type, linear type, dynamitron type or high-frequency type can be used; and in the case of hardening by means of ultraviolet-light irradiation, ultraviolet light emitted from such a light source as ultra-high-pressure mercury vapor lamp, high-pressure mercury vapor lamp, low-pressure mercury vapor lamp, carbon arc, xenone arc or metal halide lamp can be used. The total irradiation dose of activation energy rays is 0.5 Mrad or more, preferably 0.5 to 50 Mrad when electron beam is used as the activation energy rays.

Electrically Conductive Transparent Layer

The electrically conductive transparent layer is formed by using $SnO_2$ doped with antimony or ITO. This layer can be formed by any conventionally-known method such as cathode sputtering.

The refractive index of the electrically conductive transparent layer formed by such a method is from 1.80 to 2.30. The thickness of the layer is preferably in the range of approximately 100 to 300 nm.

When the electrically conductive transparent layer is formed by using a metallic oxide such as $SnO_2$ or ITO doped with antimony, having electrical conductivity, the resulting antireflection film has increased electrical conductivity, and is prevented from the deposition of dusts due to the antistatic properties. Moreover, when such an antireflection film of the present invention is used for a CRT, the effect of shielding electromagnetic wave can be obtained.

In this embodiment, a low-refractive-index layer is formed on the surface of the electrically conductive transparent layer. This low-refractive-index layer is a $SiO_2$ gel layer which can be formed by the previously-mentioned sol-gel processing.

The previously-mentioned $SiO_2$ sol is coated onto the surface of the above-described electrically conductive transparent layer by a coating method. A method for coating the $SiO_2$ sol onto the electrically conductive transparent layer, and a method for hardening the coated layer are the same as those in the previously-mentioned case where a metallic oxide sol is used.

The present invention will now be explained more specifically by referring to the following Examples and Comparative Examples. However, the present invention is not limited to the examples in any way.

EXAMPLE A1

Methyltriethoxysilane (MTEOS) was dissolved in methyl ethyl ketone solvent, so that the solid content when the MTEOS is ideally hydrolyzed and condensed to $SiO_2$ or $MeSiO_{1.5}$ would be 3% by weight, and the solution was stirred for 30 minutes until the temperature of the solution became constant at 25° C. (solution A).

To this solution A, 0.005 N hydrochloric acid serving as the catalyst was added in an amount equimolar to the alkoxide group in the MTEOS, and hydrolysis was carried out at 25° C. for 3 hours (solution B). To this solution B was added a mixture of sodium acetate and acetic acid as the hardening agent, and the resulting mixture was stirred at 25° C. for 1 hour to obtain a $SiO_2$ sol.

On the other hand, a liquid resin composition prepared by mixing an ionizing-radiation-curable resin (trade name "X-12-2400" manufactured by Shin-Etsu Chemical Co., Ltd., Japan) with $ZrO_2$ ultrafine particles (trade name "No. 926" manufactured by Sumitomo Osaka Cement Co., Ltd., Japan, refractive index=1.9) in a weight ratio of 2:1 was coated onto a PET film having a smooth surface (trade name "Lumirror T-60" manufactured by Diafoil Co., Ltd., Japan, thickness=50 micrometers) by means of gravure-reverse coating so that the thickness of the coated film would be 7 micrometers when dried. 5 Mrad of electron beam was applied to the coated film with an accelerating voltage of 175 KeV to harden the film. A hard coat layer having a high refractive index was thus formed. Onto this hard coat layer, a twin pack hardening adhesive agent (trade names "LX 660" and "KW 75" (hardening agent) manufactured by Dainippon Ink & Chemical, Inc., Japan) was coated by means of gravure-reverse coating, thereby forming an adhesive layer.

Successively, a PET film (trade name "A-4300" manufactured by Toyobo Co., Ltd., Japan, thickness=100 micrometers) was laminated to the hard coat layer through this adhesive layer, and the laminate was aged at 40° C. for 4 days. Thereafter, the firstly-mentioned PET film ("T-60") was released from the laminate, thereby transferring the hard coat layer to the PET film ("A-4300").

Onto the hard coat layer formed on the PET film ("A-4300"), the firstly-prepared $SiO_2$ sol was further coated so that the thickness of the coated film would be 0.1 micrometers when dried. The coated film was thermally-treated at 120° C. for 1 hour. Thus, an antireflection film of the present invention was obtained.

The refractive index of the $SiO_2$ gel film obtained was 1.42; and the total light transmittance, the haze value and the minimum refractive index in the visible light range of the antireflection film were 94.0%, 0.5 and 0.8, respectively. The antireflection film was thus found to be excellent in antireflection properties. Moreover, the surface pencil hardness of the antireflection film was 3H. The antireflection film was thus found to be excellent also in hardness.

EXAMPLE A2

A liquid resin composition prepared by mixing an ionizing-radiation-curable resin ("X-12-2400") with $ZrO_2$ ultrafine particles ("No. 926") in a weight ratio of 2:1 was coated onto a matte PET film having fine roughness on the surface thereof (trade name "Lumirror E-06" manufactured by Toray Industries, Inc., Japan, thickness=50 micrometers) by means of gravure-reverse coating so that the thickness of the coated film would be 7 micrometers when dried. 5 Mrad of electron beam was applied to the coated film with an accelerating voltage of 175 KeV to harden the film. A hard coat layer having antiglaring properties was thus formed. Onto this hard coat layer, a twin pack hardening adhesive agent ("LX 660" (main agent), "KW 75" (hardening agent)) was coated by means of gravure-reverse coating to form an adhesive layer.

Successively, a PET film ("A-4300") was laminated to the hard coat layer through this adhesive layer, and the laminate was aged at 40° C. for 4 days. Thereafter, the firstly-mentioned PET film ("Lumirror E06") was released from the laminate, thereby transferring the hard coat layer to the PET film ("A-4300"). The surface of the hard coat layer formed on this PET film ("A-4300") has the same fine roughness as the one on the firstly-mentioned PET film ("Lumirror E-06").

Onto the hard coat layer formed on the PET film ("A-4300"), the $SiO_2$ sol prepared in Example A1 was coated so that the thickness of the coated film would be 0.1 micrometers when dried. The coated film was thermally-treated at 120° C. for 1 hour. Thus, an antireflection film of the present invention was obtained.

The refractive index of the SiO$_2$ gel film obtained was 1.42; and the total light transmittance and the haze value of the antireflection film were 93.5% and 0.7, respectively. The antireflection film was thus found to be excellent in antireflection properties. Moreover, the surface pencil hardness of the antireflection film was 3H. The antireflection film was thus found to be excellent also in hardness.

EXAMPLE A3

A liquid resin composition prepared by mixing ZrO$_2$ ultrafine particles ("No. 926") having a refractive index of 1.9 with an ionizing-radiation-curable resin ("X-12-2400") in a weight ratio of 2:1 was coated onto a PET film having a thickness of 100 micrometers ("A-4300") serving as the transparent substrate film by means of gravure-reverse coating so that the thickness of the coated film would be 5 micrometers when dried. The solvent was removed by drying.

A matte film having fine roughness on the surface thereof ("Lumirror E-06") was laminated to the PET film ("A-4300") through the resin layer formed thereon. Thereafter, 4 Mrad of electron beam was applied to the laminate with an accelerating voltage of 150 KeV to harden the coated film. The matte PET film ("Lumirror E-06") was released from the laminate, thereby providing fine roughness on the surface of the resin layer. Successively, onto this rough surface, the SiO$_2$ sol prepared in Example A1 was coated so that the thickness of the coated film would be 0.1 micrometers when dried. The coated film was thermally-treated at 120° C. for 1 hour. Thus, an antireflection film of the present invention was obtained.

The refractive index of the SiO$_2$ gel film obtained was 1.42; and the total light transmittance and the haze value of the antireflection film were 93.5% and 0.9, respectively. The antireflection film was thus found to be excellent in both antireflection properties and antiglaring properties. Moreover, the surface pencil hardness of the antireflection film was 3H. The antireflection film was thus found to be excellent also in hardness.

COMPARATIVE EXAMPLE A1

The procedure of Example A1 was repeated except that a SiO$_x$ film was formed as the low-refractive-index layer by means of vacuum deposition, thereby obtaining a comparative antireflection film. The refractive index of the SiO$_x$ film was 1.46; and the total light transmittance and the haze value of the antireflection film were 93.7% and 1.0, respectively. This antireflection film was thus found to be inferior to those obtained in the above Examples in antireflection properties. Moreover, the surface pencil hardness of the antireflection film was 2H.

COMPARATIVE EXAMPLE A2

The procedure of Example A2 was repeated except that a SiO$_x$ film was formed as the low-refractive-index layer by means of vacuum deposition, thereby obtaining a comparative antireflection film. The refractive index of the SiO$_x$ film was 1.46; and the total light transmittance and the haze value of the antireflection film were 92.5% and 1.2, respectively. This antireflection film was thus found to be inferior to those obtained in the above Examples in antireflection properties. Moreover, the surface pencil hardness of the antireflection film was 2H.

COMPARATIVE EXAMPLE A3

The procedure of Example A3 was repeated except that a SiO$_x$ film was formed as the low-refractive-index layer by means of vacuum deposition, thereby obtaining a comparative antireflection film. The total light transmittance and the haze value of this antireflection film were 92.0% and 1.2, respectively. This antireflection film was thus found to be inferior to those obtained in the above Examples in antireflection properties. Moreover, the surface pencil hardness of the antireflection film was 2H. This hardness was lower than those of the antireflection films obtained in the above Examples.

As described above, according to the present invention, a lower silicon alkoxide is hydrolyzed to obtain fine particles of several nanometers by means of sol-gel processing; a sol in which these ultrafine particles are being dispersed is coated onto the surface of the hard coat layer provided on the transparent substrate film; and the coated film is thermally-treated at a temperature lower than the deflection temperature under load of the transparent substrate film, or irradiated with activation energy rays, thereby forming a SiO$_2$ gel layer. Therefore, a low-refractive-index layer whose quality is almost equal to that of a low-refractive-index layer obtainable by a gas phase method can be obtained, and a highly-functional antireflection film with high quality can be obtained even when a substrate, such as a plastic substrate, whose deflection temperature under load is low is used.

EXAMPLE B1

Methyltriethoxysilane (MTEOS) was dissolved in methyl ethyl ketone, solvent, so that the solid content when the MTEOS is ideally hydrolyzed and condensed to SiO$_2$ or MeSiO$_{1.5}$ would be 3% by weight, and the solution was stirred for 30 minutes until the temperature of the solution became constant at 25° C. (solution A).

To this solution A, 0.005 N hydrochloric acid serving as the catalyst was added in an amount equimolar to the alkoxide group in the MTEOS, and hydrolysis was carried out at 25° C. for 3 hours (solution B). To this solution B was added a mixture of sodium acetate and acetic acid as the hardening agent, and the resulting mixture was stirred at 25° C. for 1 hour to obtain a SiO$_2$ sol.

On the other hand, a fine particle dispersion prepared by mixing an ionizing-radiation-curable resin (trade name "X-12-2400" manufactured by Shin-Etsu Chemical Co., Ltd., Japan) with ZrO$_2$ ultrafine particles (trade name "No. 926" manufactured by Sumitomo Osaka Cement Co., Ltd., Japan, refractive index=1.9) in a weight ratio of 15:1 was coated onto a PET film having a smooth surface (trade name "Lumirror T-60" manufactured by Diafoil Co., Ltd., Japan, thickness=50 micrometers) by means of slit-reverse coating so that thickness of the coated film would be 0.1 micrometers when dried. 5 Mrad of electron beam was applied to the coated film with an accelerating voltage of 175 KeV to harden the film, thereby forming a high-refractive-index layer. Onto this high-refractive-index layer, an ionizing-radiation-curable resin ("X-12-2400") was coated by means gravure-reverse coating so that the thickness of the coated film would be 7 micrometers when dried. 5 Mrad of electron beam was applied to the coated film with an accelerating voltage of 175 KeV to harden the film, thereby forming a hard coat layer. Onto this hard coat layer, a twin pack hardening adhesive agent ("LX 660" and "KW 75" (hardening agent)) was coated by means of gravure-reverse coating, thereby forming an adhesive layer.

Successively, a PET film (trade name "A-4300" manufactured by Toyobo Co., Ltd., Japan, thickness=100 micrometers) was laminated to the hard coat layer through this adhesive layer, and the laminate was aged at 40° C. for 4 days. Thereafter, the firstly-mentioned PET film ("T-60") was released from the laminate, thereby transferring the hard coat layer and the high-refractive-index layer to the PET film ("A-4300").

Onto the high-refractive-index layer formed on the PET film ("A-4300"), the firstly-prepared $SiO_2$ sol was further coated so that the thickness of the coated film would be 0.1 micrometers when dried. The coated film was thermally-treated at 120° C. for 1 hour. Thus, an antireflection film of the present invention was obtained.

The refractive index of the $SiO_2$ gel film obtained was 1.42; and the total light transmittance, the haze value and the minimum refractive index in the visible light range of the antireflection film were 94.5%, 0.5 and 0.2, respectively. The antireflection film was thus found to be excellent in antireflection properties. Moreover, the surface pencil hardness of the antireflection film was 3H. The antireflection film was thus found to be excellent also in hardness.

EXAMPLE B2

Tetrabutoxy titanium ($Ti(OC_4H_9)_4$) was dissolved in ethyl cellosolve, solvent, so that the solid content when the tetrabutoxy titanium is ideally hydrolyzed and condensed to $TiO_2$ would be 3% by weight. The solution was stirred for 30 minutes until the temperature of the solution became constant at 25° C. (solution C).

To this solution C, 3 N hydrochloric acid serving as the catalyst was added in an amount 2.5 times the moles of the alkoxide group in the tetrabutoxy titanium, and hydrolysis was carried out at 25° C. for 3 hours, thereby obtaining a $TiO_2$ sol.

The $TiO_2$ sol thus prepared was coated onto a PET film ("Lumirror T-60") having a thickness of 50 micrometers, serving as the transparent substrate film by means of gravure-reverse coating so that the thickness of the coated film would be 0.1 micrometers when dried. The coated film was then thermally-treated at 120° C. for 1 hour to form a high-refractive-index layer (refractive index=1.9). Onto this high-refractive-index layer, a hard coat resin (trade name "X-12-2400" manufactured by Shin-Etsu Chemical Co., Ltd., Japan, 7 parts, and "Datecall Acrylate DA-250" available from NAGASE & COMPANY, LTD., Japan, 3 parts) was coated by means of gravure-reverse coating so that the thickness of the coated film would be 7 micrometers when dried. 5 Mrad of electron beam was applied to the coated film with an accelerating voltage of 175 KeV to harden the film, thereby forming a hard coat layer.

Onto this hard coat layer, a twin pack hardening adhesive agent (trade names "LX660" and "KW75" (hardening agent) manufactured by Dainippon Ink & Chemical, Inc., Japan) was coated by means of gravure-reverse coating to form an adhesive layer. Successively, a PET film ("A-4300") was laminated to the hard coat layer through this adhesive layer, and the laminate was aged at 40° C. for 4 days. Thereafter, the firstly-mentioned PET film ("T-60") was released from the laminate, thereby transferring the hard coat layer and the high-refractive-index layer to the PET film ("A-4300").

Onto the high-refractive-index layer formed on the PET film ("A-4300"), the $SiO_2$ sol prepared in Example B1 was coated so that the thickness of the coated film would be 0.1 micrometers when dried. Thus, an antireflection film of the present invention was obtained.

The refractive index of the $SiO_2$ gel film obtained was 1.42; and the total light transmittance and the haze value of the antireflection film were 94.5% and 0.4, respectively. The antireflection film was thus found to be excellent in antireflection properties. Moreover, the surface pencil hardness of the antireflection film was 3H. The antireflection film was thus found to be excellent also in hardness.

COMPARATIVE EXAMPLE B1

The procedure of Example B1 was repeated except that a $SiO_x$ film was formed as the low-refractive-index layer by means of vacuum deposition, thereby obtaining a comparative antireflection film. The refractive index of the $SiO_x$ film was 1.46; and the total light transmittance and the haze value of the antireflection film were 93.8% and 0.7, respectively. This antireflection film was thus found to be inferior to those obtained in the above Examples in antireflection properties. Moreover, the surface pencil hardness of the antireflection film was 2H.

COMPARATIVE EXAMPLE B2

The procedure of Example B2 was repeated except that a $SiO_x$ film was formed as the low-refractive-index layer by means of vacuum deposition, thereby obtaining a comparative antireflection film. The refractive index of the $SiO_x$ film was 1.46; and the total light transmittance and the haze value of the antireflection film were 94.0% and 0.5, respectively. This antireflection film was thus found to be inferior to those obtained in the above Examples in antireflection properties. Moreover, the surface pencil hardness of the antireflection film was 2H.

As described above, according to the present invention, a lower silicon alkoxide is hydrolyzed to obtain fine particles of several nanometers by means of sol-gel processing; a sol in which these ultrafine particles are being dispersed is coated onto the high-refractive-index layer formed on the hard coat layer provided on the transparent substrate film; and the coated film is thermally-treated at a temperature lower than the deflection temperature under load of the transparent substrate film, or irradiated with activation energy rays, thereby forming a $SiO_2$ gel layer. Therefore, a low-refractive-index layer whose quality is almost equal to that of a low-refractive-index layer obtainable by a gas phase method can be obtained, and a highly-functional antireflection film with high quality can be obtained even when a substrate, such as a plastic substrate, whose deflection temperature under load is low is used.

EXAMPLE C1

Methyltriethoxysilane (MTEOS) was dissolved in methyl ethyl ketone, solvent, so that the solid content when the MTEOS is ideally hydrolyzed and condensed to $SiO_2$ or $MeSiO_{1.5}$ would be 3% by weight, and the solution was stirred for 30 minutes until the temperature of the solution became constant at 25° C. (solution A).

To this solution A, 0.005 N hydrochloric acid serving as the catalyst was added in an amount equimolar to the alkoxide group in the MTEOS, and hydrolysis was carried out at 25° C. for 3 hours (solution B). To this solution B was added a mixture of sodium acetate and acetic acid as the hardening agent, and the resulting mixture was stirred at 25° C. for 1 hour to obtain a $SiO_2$ sol.

On the other hand, a fine particle dispersion prepared by mixing an ionizing-radiation-curable resin (trade name "X-12-2400" manufactured by Shin-Etsu Chemical Co., Ltd., Japan) with $ZrO_2$ ultrafine particles (trade name "No. 926" manufactured by Sumitomo Osaka Cement Co., Ltd., Japan, refractive index=1.9) in a weight ratio of 15:1 was coated onto a PET film having a smooth surface (trade name "Lumirror T-60" manufactured by Diafoil Co., Ltd., Japan, thickness=50 micrometers) by means of slit-reverse coating so that thickness of the coated film would be 0.1 micrometers when dried. 5 Mrad of electron beam was applied to the coated film with an accelerating voltage of 175 KeV to harden the film, thereby forming a high-refractive-index layer.

Onto this high-refractive-index layer formed on the PET film, a hard coat resin (trade name "X-12-2400" manufactured by Shin-Etsu Chemical Co., Ltd., Japan) was coated by means gravure-reverse coating so that the thickness of the coated film would be 7 micrometers when dried. 5 Mrad of electron beam was applied to the coated film with an accelerating voltage of 175 KeV to harden the film, thereby forming a hard coat layer.

Onto this hard coat layer, a twin pack hardening adhesive agent (trade names "LX 660" and "KW 75" manufactured by Dainippon Ink & Chemical, Inc., Japan) was coated by means of gravure-reverse coating to form an adhesive layer. Successively, a PET film (trade name "A-4300" manufactured by Toyobo Co., Ltd., Japan, thickness=100 micrometers) was laminated to the hard coat layer through this adhesive layer, and the laminate was aged at 40° C. for 4 days. Thereafter, the firstly-mentioned PET film ("T-60") was released from the laminate, thereby transferring the hard coat layer and the high-refractive-index layer to the PET film ("A-4300").

Onto the high-refractive-index layer formed on the PET film ("A-4300"), an indium oxide-tin oxide (ITO) layer having transparency, electrical conductivity and excellent electro-magnetic-wave-shielding properties was formed as the transparent electrically conductive layer by means of cathode sputtering so that the thickness of the ITO layer would be 145 nm.

Onto this ITO layer formed on the PET film ("A-4300"), the firstly-prepared $SiO_2$ sol was further coated so that the thickness of the coated film would be 0.1 micrometers when dried. The coated film was thermally-treated at 120° C. for 1 hour. Thus, an antireflection film of the present invention was obtained.

The refractive index of the $SiO_2$ gel film obtained was 1.42; and the total light transmittance, the haze value and the minimum refractive index in the visible light range of the antireflection film were 94.0%, 0.5 and 0.2, respectively. The antireflection film was thus found to be excellent in antireflection properties. Moreover, the surface pencil hardness of the antireflection film was 3H. The antireflection film was thus found to be excellent also in hardness.

EXAMPLE C2

Tetrabutoxy titanium ($Ti(OC_4H_9)_4$) was dissolved in ethyl cellosolve, solvent, so that the solid content when the tetrabutoxy titanium is ideally hydrolyzed and condensed to $TiO_2$ would be 3% by weight. The solution was stirred for 30 minutes until the temperature of the solution became constant at 25° C. (solution C).

To this solution C, 3 N hydrochloric acid serving as the catalyst was added in an amount 2.5 times the moles of the alkoxide group in the tetrabutoxy titanium, and hydrolysis was carried out at 25° C. for 3 hours, thereby obtaining a $TiO_2$ sol.

The $TiO_2$ sol thus prepared was coated onto a PET film ("Lumirror T-60") having a thickness of 50 micrometers serving as the transparent substrate film by means of gravure-reverse coating so that the thickness of the coated film would be 0.1 micrometers when dried. The coated film was then thermally-treated at 120° C. for 1 hour to form a high-refractive-index layer (refractive index=1.9). Onto this high-refractive-index layer, a hard coat resin (trade name "X-12-2400" manufactured by Shin-Etsu Chemical Co., Ltd., Japan, 7 parts, and "Danacall Acrylate DA-250" available from NAGASE & COMPANY, LTD., Japan, 3 parts) was coated by means of gravure-reverse coating so that the thickness of the coated film would be 7 micrometers. 5 Mrad of electron beam was applied to the coated film with an accelerating voltage of 175 KeV to harden the film, thereby forming a hard coat layer.

Onto this hard coat layer, a twin pack hardening adhesive agent (trade names "LX660" and "KW75" (hardening agent) manufactured by Dainippon Ink & Chemical, Inc., Japan) was coated by means of gravure-reverse coating to form an adhesive layer. Successively, a PET film ("A-4300") was laminated to the hard coat layer through this adhesive layer, and the laminate was aged at 40° C. for 4 days. Thereafter, the firstly-mentioned PET film ("T-60") was released from the laminate, thereby transferring the hard coat layer and the high-refractive-index layer to the PET film ("A-4300").

Onto the high-refractive-index layer formed on the PET film ("A-4300"), an indium oxide-tin oxide (ITO) layer having transparency, electrical conductivity and excellent electro-magnetic-wave-shielding properties was formed as the transparent electrically conductive layer by means of cathode sputtering so that the thickness of the ITO layer would be 145 nm.

Onto this ITO layer formed on the PET film ("A-4300"), the $SiO_2$ sol (solution C) was further coated so that the thickness of the coated film would be 0.1 micrometers when dried. The resultant was thermally-treated at 120° C. for 1 hour. Thus, an antireflection film of the present invention was obtained.

The refractive index of the $SiO_2$ gel film obtained was 1.42; and the total light transmittance, the haze value, and the minimum reflection in the visible light range of the antireflection film were 94.0%, 0.7 and 0.3, respectively. The antireflection film was thus found to be excellent in antireflection properties.

COMPARATIVE EXAMPLE C1

The procedure of Example C1 was repeated except that a $SiO_x$ film was formed as the low-refractive-index layer by means of vacuum deposition, thereby obtaining a comparative antireflection film. The refractive index of the $SiO_x$ film was 1.46; and the total light transmittance and the haze value of the antireflection film were 94.0% and 0.6, respectively. This antireflection film was thus found to be almost equal to those obtained in the above Examples in antireflection properties. However, the surface pencil hardness of this antireflection film was 2H. This hardness was lower than those of the antireflection films obtained in the above Examples.

COMPARATIVE EXAMPLE C2

The procedure of Example C2 was repeated except that a $SiO_x$ film was formed as the low-refractive-index layer by means of vacuum deposition, thereby obtaining a comparative antireflection film. The refractive index of the $SiO_x$ film was 1.46; and the total light transmittance and the haze value of the antireflection film were 93.5% and 0.8, respectively. This antireflection film was thus found to be inferior to those obtained in the above Examples in antireflection properties. Moreover, the surface pencil hardness of the antireflection film was 2H. This hardness was lower than those of the antireflection films obtained in the above Examples.

As described above, according to the present invention, a lower silicon alkoxide is hydrolyzed to obtain fine particles of several nanometers by means of sol-gel processing; a sol in which these ultrafine particles are being dispersed is coated onto the transparent substrate film through the hard coat layer and the high-refractive-index layer, or through the hard coat layer, the high-refractive-index layer and the transparent electrically conductive layer; and the coated film is thermally-treated at a temperature lower than the deflection temperature under load of the transparent substrate film, or irradiated with activation energy rays, thereby forming a $SiO_2$ gel layer. Therefore, an antireflection film can be obtained even when a substrate, such as a plastic substrate, whose deflection temperature under load is low is used, and a low-refractive-index layer whose refractive index is lower than those of thin films obtainable by a gas phase method can be obtained.

We claim:

1. An antireflection film comprising:

a transparent substrate film;

a hard coat layer formed on the transparent substrate film either directly or through other layer; and a low-refractive-index layer formed on the hard coat layer either directly or through other layer, the low-refractive-index layer comprising a $SiO_2$ gel layer formed by using a $SiO_2$ sol prepared by hydrolyzing a silicon alkoxide represented by $CH_3Si(OR)_3$ wherein R is an alkyl group having 1 to 3 carbon atoms.

2. The antireflection film according to claim 1, wherein the hard coat layer is a hardened layer made from a composition comprising an ionizing-radiation-curable resin containing siloxane-modified acrylate, and epoxyacrylate.

3. The antireflection film according to claim 1, wherein the low-refractive-index layer has a refractive index of 1.38 to 1.46.

4. The antireflection film according to claim 1, having, on the outermost surface thereof, fine roughness capable of imparting antiglaring properties to the antireflection film.

5. The antireflection film according to claim 1, wherein the hard coat layer has a refractive index of 1.50 to 2.30.

6. The antireflection film according to claim 1, wherein the low-refractive-index layer is formed by a method comprising the following steps of:

providing a $SiO_2$ sol by hydrolyzing a silicon alkoxide represented by $CH_3Si(OR)_n$ wherein R is an alkyl group having 1 to 3 carbon atoms, coating the $SiO_2$ sol onto the surface of the transparent substrate film either directly or through other layer, and thermally-treating the coated layer, or irradiating the coated layer with ionizing radiation, thereby converting the $SiO_2$ sol into a $SiO_2$ gel layer.

7. The antireflection film according to claim 6, wherein the $SiO_2$ sol further contains, as a hardening agent, sodium acetate and acetic acid.

8. The antireflection film according to claim 1, wherein the low-refractive-index layer further contains silica granules having a diameter of 30 to 60 nm, and has a refractive index of 1.42 or less.

9. The antireflection film according to claim 1, wherein a high-refractive-index layer is further provided between the hard coat layer and the low-refractive-index layer.

10. The antireflection film according to claim 9, wherein the high-refractive-index layer is a metallic oxide gel layer made from a metallic oxide sol prepared by hydrolyzing a lower metallic alkoxide represented by $Ti(OR)_4$ wherein R represents an alkyl group having 2 to 4 carbon atoms.

11. The antireflection film according to claim 9, wherein the high-refractive-index layer has a refractive index of 1.50 to 2.30.

12. The antireflection film according to claim 9, wherein the high-refractive-index layer is formed by a method comprising the steps of:

providing a metallic oxide sol by hydrolyzing a lower metallic alkoxide represented by $Ti(OR)_4$ wherein R represents an alkyl group having 2 to 4 carbon atoms, coating the metallic oxide sol onto the surface of a desired material, thermally-treating the coated layer, or irradiating the coated layer with ionizing radiation, thereby converting the metallic oxide sol into a metallic oxide gel layer.

13. The antireflection film according to claim 9, wherein an electrically conductive transparent layer is further provided between the high-refractive-index layer and the low-refractive-index layer.

14. The antireflection film according to claim 13, wherein the electrically conductive transparent layer is an indium oxide-tin oxide (ITO) layer having transparency, electric conductivity and excellent electromagnetic-wave-shielding properties.

15. The antireflection film according to claim 14, wherein the electrically conductive transparent layer is formed by means of cathode sputtering.

16. The antireflection film according to claim 13, wherein the electrically conductive transparent layer has a refractive index of 1.80 to 2.30.

* * * * *